United States Patent
Uchiyashiki et al.

(10) Patent No.: US 11,764,359 B2
(45) Date of Patent: Sep. 19, 2023

(54) BINDER INCLUDING COPOLYMER OF STYRENE, (METH)ACRYLATE, AND SURFACTANT HAVING UNSATURATED BOND, SLURRY HAVING THE SAME, NONAQUEOUS BATTERY ELECTRODE USING THE SAME, AND NONAQUEOUS BATTERY USING THE SAME

(71) Applicant: RESONAC CORPORATION, Tokyo (JP)

(72) Inventors: Junya Uchiyashiki, Himeji (JP); Mitsuru Hanasaki, Himeji (JP); Tomonori Kurata, Kawasaki (JP)

(73) Assignee: RESONAC CORPORATION, Tokyo (JP)

( * ) Notice: Subject to any disclaimer, the term of this patent is extended or adjusted under 35 U.S.C. 154(b) by 186 days.

(21) Appl. No.: 16/957,324

(22) PCT Filed: Dec. 26, 2018

(86) PCT No.: PCT/JP2018/047734
§ 371 (c)(1),
(2) Date: Jun. 23, 2020

(87) PCT Pub. No.: WO2019/131710
PCT Pub. Date: Jul. 4, 2019

(65) Prior Publication Data
US 2020/0350590 A1 Nov. 5, 2020

(30) Foreign Application Priority Data
Dec. 26, 2017 (JP) .................. 2017-249921

(51) Int. Cl.
*H01M 4/62* (2006.01)
*C08F 212/08* (2006.01)
*H01M 10/0525* (2010.01)

(52) U.S. Cl.
CPC ........... *H01M 4/622* (2013.01); *C08F 212/08* (2013.01); *H01M 10/0525* (2013.01); *C08F 2800/20* (2013.01)

(58) Field of Classification Search
CPC .............................. H01M 4/622; C08F 212/08
USPC ........................................................ 429/217
See application file for complete search history.

(56) References Cited

U.S. PATENT DOCUMENTS

| | | | |
|---|---|---|---|
| 2008/0032192 A1 | 2/2008 | Yokomizo et al. | |
| 2013/0216906 A1* | 8/2013 | Kang | H01M 4/131 526/287 |
| 2016/0141720 A1 | 5/2016 | Onozaki et al. | |
| 2016/0248095 A1* | 8/2016 | Kurata | H01M 4/622 |
| 2017/0069913 A1 | 3/2017 | Yano et al. | |
| 2018/0233750 A1 | 8/2018 | Aoki et al. | |
| 2018/0301704 A1 | 10/2018 | Uchiyashiki et al. | |

FOREIGN PATENT DOCUMENTS

| | | | | |
|---|---|---|---|---|
| CN | 105580174 A | 5/2016 | | |
| JP | 8-250123 A | 9/1996 | | |
| JP | 10-298386 A | 11/1998 | | |
| JP | 2005-183032 A | 7/2005 | | |
| JP | 2006-260782 A | 9/2006 | | |
| JP | 2006-339010 A | 12/2006 | | |
| JP | 2007-179765 A | 7/2007 | | |
| JP | 2011-134649 A | 7/2011 | | |
| JP | 2011-243464 A | 12/2011 | | |
| JP | 2016-31837 A | 3/2016 | | |
| JP | 2016-42408 A | 3/2016 | | |
| TW | 201251182 A | 12/2012 | | |
| WO | 2012/111425 A1 | 8/2012 | | |
| WO | 2014/014006 A1 | 1/2014 | | |
| WO | 2015/119084 A1 | 8/2015 | | |
| WO | WO-2015119084 A1 * | 8/2015 | ............... | H01M 4/13 |
| WO | WO-2015119085 A1 * | 8/2015 | ............ | H01M 4/622 |
| WO | 2015/133492 A1 | 9/2015 | | |
| WO | WO-2015146648 A1 * | 10/2015 | ............... | H01M 4/13 |
| WO | WO-2015146649 A1 * | 10/2015 | ............... | H01M 4/13 |
| WO | 2016/002637 A1 | 1/2016 | | |
| WO | WO-2016103559 A1 * | 6/2016 | ............... | H01M 2/16 |
| WO | 2016/199653 A1 | 12/2016 | | |
| WO | 2017/026345 A1 | 2/2017 | | |
| WO | 2017/110654 A1 | 6/2017 | | |
| WO | 2017/122540 A1 | 7/2017 | | |
| WO | WO-2019131710 A1 * | 7/2019 | ................ | C08F 2/24 |

OTHER PUBLICATIONS

Taiwanese Office Action for 107147172 dated Jan. 3, 2020.
International Search Report for PCT/JP2018/047734 dated Mar. 12, 2019 (PCT/ISA/210).

* cited by examiner

*Primary Examiner* — Sean P Cullen
(74) *Attorney, Agent, or Firm* — Sughrue Mion, PLLC

(57) ABSTRACT

A binder for a nonaqueous battery electrode, the nonaqueous battery electrode using the binder for the nonaqueous battery electrode, and a nonaqueous battery. The binder for a nonaqueous battery electrode contains a copolymer (P) of an ethylenically unsaturated monomer (A) essentially containing a styrene-based monomer (a1) and a (meth)acrylate ester (a2), and a surfactant (B1) having an ethylenically unsaturated bond, wherein the total amount of structure units derived from the surfactant (B1) having the ethylenically unsaturated bond in the copolymer (P) and the surfactant (B2) not contained in the copolymer (P) is 0.10 to 1.00 parts by mass based on 100 parts by mass of the copolymer (P). Also disclosed is a method for producing the binder.

10 Claims, No Drawings

BINDER INCLUDING COPOLYMER OF STYRENE, (METH)ACRYLATE, AND SURFACTANT HAVING UNSATURATED BOND, SLURRY HAVING THE SAME, NONAQUEOUS BATTERY ELECTRODE USING THE SAME, AND NONAQUEOUS BATTERY USING THE SAME

CROSS REFERENCE TO RELATED APPLICATIONS

This application is a National Stage of International Application No. PCT/JP2018/047734 filed Dec. 26, 2018, claiming priority based on Japanese Patent Application No. 2017-249921, filed Dec. 26, 2017.

TECHNICAL FIELD

The present invention relates to a binder for a nonaqueous battery electrode used for forming an electrode of a nonaqueous battery, a slurry for a nonaqueous battery electrode containing the binder for the nonaqueous battery electrode and an active material, a nonaqueous battery electrode formed by using the slurry for the nonaqueous battery electrode, and a nonaqueous battery obtained by using the nonaqueous battery electrode.

This application claims priority based on Japan Patent Application No. 2017-249921 filed in Japan on Dec. 26, 2017, the contents of which are incorporated herein by reference.

BACKGROUND ART

As the nonaqueous battery, a lithium ion secondary battery is exemplified as a representative example. Nonaqueous batteries are used as a power source for notebook PCs, mobile phones, power tools, and electronic and communication equipment in terms of smaller size, and lighter weight. In addition, nonaqueous batteries have recently been used for electric vehicles and hybrid vehicles from the viewpoint of application to environmental vehicles. Therefore, there is a strong demand for a nonaqueous battery having a higher output, a high capacity and a long life.

The nonaqueous battery is a secondary battery which is composed of a positive electrode, a negative electrode, and an electrolyte solvent, and is charged and discharged by moving ions between the positive electrode and the negative electrode. A metal oxide or the like is used as an active material for the positive electrode. A carbon material such as graphite or silicon is used as an active material for the negative electrode. Carbonates, flame-retardant ionic liquids and the like are mainly used as the electrolyte solvent. An example of a method of manufacturing an electrode of such a nonaqueous battery includes the following method. The positive electrode is obtained by coating a slurry comprising a metal oxide and a binder on the surface of a positive electrode current collector such as an aluminum foil, drying it, and cutting it into an appropriate size. The negative electrode is obtained by coating a slurry comprising a carbon material and a binder on the surface of a negative electrode current collector such as a copper foil, drying it, and cutting it into an appropriate size. Therefore, each binder has a role of binding the active materials to each other, binding the active materials to the current collector, and preventing separation of the active materials from the current collector.

As a binder, a polyvinylidene fluoride (PVDE) binder using an organic solvent-based N-methyl-2-pyrrolidone (NMP) as a solvent is well known (Patent Document 1). However, the binder has poor binding properties between the active materials and between the active materials and the current collector, and requires a large amount of the binder for actual use. Therefore, there is a disadvantage that the capacity of the nonaqueous battery is reduced. In addition, since the binder uses NMP which is an expensive organic solvent, there has been a problem in the price of the final product.

As a method for solving these problems, development of water dispersion type binders has been promoted. For example, a styrene-butadiene rubber (SBR) water dispersion in which carboxymethyl cellulose (CMC) is used in combination as a thickener is known (Patent Document 2).

However, even in this binder, since the binding property between the active materials and the binding property between the active materials and the current collector are insufficient, there is a problem that a part of the active materials is peeled off in the step of cutting the current collector when the electrode is produced with a small amount of binder. Further, since the SBR-based binder has low elution resistance and swelling resistance to the non-aqueous solvent used in the electrolyte, there has been a problem that the nonaqueous battery obtained by using the binder cannot have a long life.

Under this background, a method has been proposed in which a non-diene-based polymer containing styrene and an ethylenically unsaturated carboxylic acid ester as main components is used as a water-dispersible binder in place of the conventional SBR (Patent Document 3).

[Patent Document 1] Japanese Unexamined Patent Application Publication No.H10-298386

[Patent Document 2] Japanese Unexamined Patent Application Publication No. H08-250123

[Patent Document 3] Japanese Unexamined Patent Application Publication No. 2011-243464

SUMMARY OF THE INVENTION

However, if it is desired to achieve a high energy density and a high capacity battery, the electrode becomes thicker and higher density. Even if an electrolyte solution is poured into such a battery, there is a problem that the penetration of the electrolyte solution into the electrode is poor, the initial capacity of the battery is low, and the internal resistance of the battery is high.

It is an object of the present invention to provide a binder for a nonaqueous battery electrode which improves the initial capacity of a battery and reduces the internal resistance of the battery. In addition, it is an object of the present invention to provide a nonaqueous battery electrode and a nonaqueous battery using the binder for the nonaqueous battery electrode.

The present invention for solving the above problems is as follows.

[1] A binder for a nonaqueous battery electrode, comprising a copolymer (P) of an ethylenically unsaturated monomer (A) comprising a styrene-based monomer (a1) and a (meth)acrylate (a2); and
    a surfactant (B1) having an ethylenically unsaturated bond,
        wherein a total amount of
            a structural unit derived from the surfactant (B1) having the ethylenically unsaturated bond in the copolymer (P) and a surfactant (B2) not contained in the copolymer (P) is 0.10 to 1.00 parts by mass with respect to 100 parts by mass of the copolymer (P).

[2] The binder for the nonaqueous battery electrode according to [1],
wherein the total amount of
the structural unit derived from the surfactant (B1) having an ethylenically unsaturated bond in the copolymer (P) and
the surfactant (B2) not contained in the copolymer (P)
is 0.10 parts by mass or more and less than 0.30 parts by mass with respect to 100 parts by mass of the ethylenically unsaturated monomer (A).

[3] The binder for the nonaqueous battery electrode according to [1],
wherein in the ethylenically unsaturated monomer (A), the total amount of the styrene-based monomer (a1) and the (meth)acrylate (a2) is 70 to 100% by mass.

[4] The binder for a nonaqueous battery electrode according to any one of [1] to [3],
wherein in the ethylenically unsaturated monomer (A), the total amount of the styrene-based monomer (a1) is 15.0 to 70.0% by mass.

[5] The binder for nonaqueous battery electrodes according to any one of [1] to [4],
wherein in the ethylenically unsaturated monomer (A), the total amount of the (meth)acrylate (a2) is 30.0 to 85.0% by mass.

[6] The binder for nonaqueous battery electrodes according to any one of [1] to [5],
wherein the styrene-based monomer (a1) is at least one selected from the group consisted of styrene, chlorostyrene, vinyltoluene, t-butylstyrene, vinylbenzoic acid, methyl vinylbenzoate, vinylnaphthalene, chloromethylstyrene, hydroxymethylstyrene, p-styrenesulfonic acid, and sodium p-styrenesulfonate.

[7] The binder for a nonaqueous battery electrode according to any one of [1] to [6], further comprises:
an ethylenically unsaturated carboxylic acid (a3) having one ethylenically unsaturated bond in the molecule.

[8] The binder for a nonaqueous battery electrode according to any one of [1] to [7],
wherein the binder has a glass transition temperature of 30° C. or less.

[9] A slurry for a nonaqueous battery electrode, comprising
an active material
the binder for the nonaqueous battery electrode according to any one of [1] to [8]; and
an aqueous medium.

[10] A nonaqueous battery electrode, comprising:
an electrode current collector, and
an active material layer formed by drying the slurry for the nonaqueous battery electrodes according to [9] on at least one surface of the electrode current collector.

[11] A nonaqueous battery comprising the nonaqueous battery electrode of [10].

[12] A method of producing a binder for a nonaqueous battery electrode, the method comprising:
performing emulsion polymerization of an ethylenically unsaturated monomer (A) comprising
a styrene-based monomer (a1) and
an ethylenically unsaturated carboxylic acid ester (a2) in the presence of a surfactant (B),
wherein an amount of the surfactant (B) is 0.10 to 1.00 parts by mass with respect to 100 parts by mass of the ethylenically unsaturated monomer (A).

According to the present invention, it is possible to provide a binder for a nonaqueous battery electrode that improves the initial capacity of the battery and reduces the internal resistance of the battery. In addition, the slurry for the nonaqueous battery electrode using the binder for the nonaqueous battery electrode, the nonaqueous battery electrode, and the nonaqueous battery can be provided.

DETAILED DESCRIPTION OF THE INVENTION

In this specification, "(meth)acrylic" is a generic term for acrylic and methacrylic, and "(meth)acrylate" is a generic term for acrylate and methacrylate.

In this specification, a binder for the nonaqueous battery electrode is sometimes simply referred to as "binder".

In this specification, a slurry for the nonaqueous battery electrode is sometimes simply referred to as "slurry".

Binder for Nonaqueous Battery Electrode

The binder for a nonaqueous battery electrode contains a copolymer (P). The copolymer (P) is a copolymer of an ethylenically unsaturated monomer (A) essentially containing a styrene-based monomer (a1) and an ethylenically unsaturated carboxylic acid ester (a2), and a surfactant (B1) having an ethylenically unsaturated bond. The binder for the nonaqueous battery electrode of the present invention may further not contain a surfactant having no ethylenically unsaturated bond (B2), but preferably contains it. The total amount of the structural unit derived from the surfactant (B1) having the ethylenically unsaturated bond and the surfactant (B2) having no ethylenically unsaturated bond in the copolymer (P) is 0.10 to 1.00 parts by mass with respect to 100 parts by mass of the copolymer (P). Since the surfactant (B2) does not have an ethylenically unsaturated bond, the copolymer (P) does not contain a structure derived from the surfactant (B2) (It is sometimes simply said that the copolymer (P) does not contain surfactant (B2).).

The binder for the nonaqueous battery electrode of the present invention preferably has a glass transition temperature (Tg) of −55 to 30° C., more preferably −25 to 25° C., and still more preferably −20 to 10° C. When the Tg of the binder is −55° C. or more, binding properties between the active materials of the binder and between the active materials and the current collector can be easily developed. When the Tg of the binder is 30° C. or less, the electrode obtained by applying the slurry containing the binder and the active material is easily prevented from cracking. Tg of the binder can be adjusted by changing kinds of the monomers or amount of the monomers contained in the ethylenically unsaturated monomer (A).

The glass transition temperature of the binder for a nonaqueous battery electrode of the present invention is a theoretical value calculated from the glass transition temperature $Tg_i$ (i=1, 2, . . . , i) of a homopolymer of various ethylenically unsaturated monomers $M_i$ (i=1, 2, . . . , i) and each mass fraction $X_i$ (i=1, 2, . . . , i) of various ethylenically unsaturated monomers $M_i$ by a good approximation according to the following formula (I). The various ethylenically unsaturated monomers $M_i$ are the various ethylenically unsaturated monomers contained in the ethylenically unsaturated monomer (A) used in the copolymer (P).

$$1/Tg = \Sigma(X_i/Tg_i) \tag{I}$$

Ethylenically Unsaturated Monomer (A)

The ethylenically unsaturated monomer (A) used as the binder for the nonaqueous battery electrode contains a styrene-based monomer (a1) and an ethylenically unsaturated carboxylic acid ester (a2) as essential components. The total amount of the styrene-based monomer (a1) and the ethylenically unsaturated carboxylic ester (a2) is preferably 70 to 100% by mass based on the ethylenically unsaturated monomer (A).

The ethylenically unsaturated monomer (A) used as a binder for a nonaqueous battery electrode according to one embodiment of the present invention preferably contains a styrene-based monomer (a1), an ethylenically unsaturated carboxylic acid ester (a2), and an ethylenically unsaturated carboxylic acid (a3).

The ethylenically unsaturated monomer (A) used as a binder for a nonaqueous battery electrode according to another embodiment of the present invention can contain a styrene-based monomer (a1), an ethylenically unsaturated carboxylic acid ester (a2), an ethylenically unsaturated carboxylic acid (a3), and an internal crosslinking agent (a4).

More preferably, the total amount of (a1) to (a4) is 70 to 100% by mass based on the total mass of the ethylenically unsaturated monomer (A).

More preferably, the total amount of the structures derived from the monomers (a1) to (a4) is 70 to 100% by mass with respect to the total mass of the structures derived from the ethylenically unsaturated monomer (A) in the binder for the nonaqueous battery electrode of the present invention.

Styrene-Based Monomers (a1)

The ethylenically unsaturated monomer (A) contains a styrene-based monomer (a1) as an essential component.

The amount of the styrene-based monomer (a1) used is preferably 15.0 to 70.0% by mass, more preferably 30.0 to 60.0% by mass based on the total mass of the ethylenically unsaturated monomer (A). When the amount of the styrene-based monomer used is 15.0% by mass or more, bonding between the active materials is excellent, and the adhesion between the active material and the current collector is improved. On the other hand, if the amount of styrene-based monomer (a1) used is 70.0% by mass or less, the glass transition temperature (Tg) of the binder can be lowered, so that the electrode obtained by coating the slurry containing the active material is prevented from cracking.

Examples of the styrene-based monomer (a1) include styrene, styrene which has a substituent group and does not contain an ethylenically unsaturated bond in an aromatic ring; vinylnaphthalene and vinylnaphthalene which has a substituent and does not contain an ethylenically unsaturated bond in an aromatic ring; and the like. Styrene-based monomers (a1) contain only one ethylenically unsaturated bond in the molecule.

Examples of the styrene having a substituent on the aromatic ring include chlorostyrene, vinyltoluene, t-butylstyrene, vinylbenzoic acid, methyl vinylbenzoate, chloromethylstyrene, hydroxymethylstyrene, p-styrenesulfonic acid, sodium p-styrenesulfonic acid, and the like.

Among them, styrene, p-styrenesulfonic acid and sodium p-styrenesulfonic acid are preferable, and styrene is more preferable because it develops the binding property between the active materials. In particular, when a carbon material such as graphite is used as the active material, styrene can further exhibit the effect.

[(Meth)acrylic Esters (a2)]

The ethylenically unsaturated monomer (A) used in the binder for the nonaqueous battery electrode contains an ethylenically unsaturated carboxylic acid ester (a2).

The ethylenically unsaturated carboxylic acid ester (a2) is preferably 30.0 to 85.0% by mass, more preferably 35.0 to 65.0% by mass, and still more preferably 40.0 to 55.0% by mass based on the total mass of the ethylenically unsaturated monomer (A).

That is, the amount of the structures derived from the ethylenically unsaturated carboxylic acid ester (a2) is preferably 30.0 to 85.0% by mass, more preferably 35.0 to 65.0% by mass, and still more preferably 40.0 to 55.0% by mass with respect to the total mass of the structure derived from the ethylenically unsaturated monomer (A) in the copolymer (P).

When the amount of the ethylenically unsaturated carboxylic acid ester (a2) is 30.0% by mass or more, the formed electrode has good flexibility and heat resistance, and when the amount is 85.0% by mass or less, the binding property between the active materials and the current collector is improved.

The (meth)acrylate (a2) contains only one ethylenically unsaturated bond in the molecule. Examples of the (meth)acrylic ester (a2) include alkyl (meth)acrylate, hydroxyalkyl (meth)acrylate, and glycidyl (meth)acrylate. Specific examples of alkyl (meth)acrylates include methyl (meth)acrylate, ethyl (meth)acrylate, n-propyl (meth)acrylate, iso-propyl (meth)acrylate, n-butyl acrylate, iso-butyl (meth)acrylate, tert-butyl (meth)acrylate, n-hexyl (meth)acrylate, 2-ethylhexyl (meth)acrylate, lauryl (meta)acrylate (meth)acrylate, stearyl (meth)acrylate, cyclohexyl (meth)acrylate, isonononyl (meth)acrylate, isoboronyl (meth)acrylate, benzyl (meth)acrylate, and the like. Specific examples of the hydroxyalkyl (meth)acrylate include 2-hydroxyethyl (meth)acrylate, 2-hydroxypropyl (meth)acrylate, and the like. Among them, n-butyl (meta)acrylate (meth)acrylate, 2-ethylhexyl (meth)acrylate, lauryl (meth)acrylate, isoboronyl (meth)acrylate, and 2-hydroxyethyl (meth)acrylate are preferable from the viewpoint of ease of emulsion polymerization and flexibility of the electrode.

Ethylenically Unsaturated Carboxylic Acids (a3)

The ethylenically unsaturated monomer (A) preferably contains an ethylenically unsaturated carboxylic acid (a3). There is only one ethylenically unsaturated bond in the molecule of an ethylenically unsaturated carboxylic acid (a3).

When an ethylenically unsaturated carboxylic acid (a3) is used, the amount of the monomer (a3) is preferably 0.10 to 10.0% by mass, more preferably 0.50 to 6.0% by mass based on the total mass of the ethylenically unsaturated monomer (A).

That is, the amount of the structures derived from the monomer (a3) is preferably 0.10 to 10.0% by mass, more preferably 0.50 to 6.0% by mass, based on the total mass of the structure derived from the ethylenically unsaturated monomer (A) in the copolymer (P).

When the amount of the ethylenically unsaturated carboxylic acid (a3) is 0.10% by mass or more, emulsion polymerization stability or mechanical stability is excellent, and the swelling resistance of the binder dry film for the nonaqueous battery electrode to the electrolyte tends to be improved. On the other hand, when it is 10.0% by mass or less, the binding property between the active materials and between the active materials and the current collector is good.

Specific examples of the ethylenically unsaturated carboxylic acid (a3) include acrylic acid, methacrylic acid, crotonic acid, maleic acid, fumaric acid, itaconic acid, and the like, among which acrylic acid or itaconic acid is preferable from the viewpoint of easy emulsion polymerization.

Internal Crosslinking Agents (a4)

The ethylenically unsaturated monomer (A) may contain an internal crosslinking agent (a4).

When an internal crosslinking agent is used, the amount of the internal crosslinking agent (a4) is preferably 0.06 to 5.00% by mass, more preferably 0.06 to 3.00% by mass based on the total mass of the ethylenically unsaturated monomer (A).

When the amount of the internal crosslinking agent (a4) is 0.06% by mass or more, the swelling resistance of the binder dry film for the nonaqueous battery electrode to the electrolyte is improved, and when the amount is 5.00% by mass or less, the polymerization stability and the adhesion between the active materials and the current collector are good.

That is, the amount of the structure derived from the internal crosslinking agent (a4) is preferably 0.06 to 5.00% by mass, more preferably 0.06 to 3.00% by mass, with respect to the total mass of the structure derived from the ethylenically unsaturated monomer (A) in the binder for the nonaqueous battery electrode of the present invention.

An "internal crosslinking agents (a4)" according to the present invention has two or more ethylenically unsaturated bonds.

Specific examples of the internal crosslinking agent (a4) according to the present invention include a crosslinkable polyfunctional monomer having two or more unsaturated groups, a silane coupling agent, and the like. Specific examples of the crosslinkable multifunctional monomer having two or more unsaturated groups include divinylbenzene, ethylene glycol di(meth)acrylate, trimethylolpropane tri(meth)acrylate, and triallyl cyanurate. Specific examples of the silane coupling agent include vinyltrimethoxysilane, vinyltriethoxysilane, γ-methacryloxypropyltrimethoxysilane, γ-methacryloxypropyltriethoxysilane, and the like. Of these, divinylbenzene is preferable. These internal crosslinking agents may be used alone or in combination of two or more.

[Other Ethylenically Unsaturated Monomers (a5)]

The ethylenically unsaturated monomer (A) may contain an ethylenically unsaturated monomer other than (a1)-(a4). Such monomers include diene-based monomers, N-atom-containing monomers, phosphate-containing monomers, nitrile group-containing monomers, vinyl acetate, vinyl propionate, and the like. Specific examples of the diene monomer include butadiene, isoprene and the like. Specific examples of the N-atom-containing monomers include vinylpyrrolidone, vinylacetamide, N-alkyl (meta)acrylamide (meth)acrylamide, N-methylol (meta)acrylamide (meth)acrylamide, N, N-dialkyl (meta)acrylamide (meth)acrylamide, N-hydroxyalkyl (meta)acrylamide (meth)acrylamide having an alkyl group with a carbon number of 1 to 3, diaceton (meth)acrylamide, and dimethylaminoalkyl (meth)acrylamide and (meth)acrylamide-2-methylpropanesulfonic acid, having an alkyl group with a carbon number of 1 to 5 in a portion other than the dimethylamino group, and the like. Specific examples of the phosphate ester-containing monomer include 2-methacryloyloxyethyl acid phosphate, bis(2-hydroxyethyl methacrylate) phosphate, acid phosphoxy polyoxyethylene glycol monomethacrylate, acid phosphoxy polyoxypropylene glycol monomethacrylate, 3-chloro-2-acid phosphooxypropyl methacrylate, methacryloyloxyethyl acid phosphate monoethanolamine half salt, and the like. Specific examples of the nitrile group-containing monomer include acrylonitrile and the like.

As the monomer forming the copolymer (P), mercaptan, thioglycolic acid and its ester, β-mercaptopropionic acid and its ester, or the like may be used in order to adjust the molecular weight.

Surfactant (B)

The surfactant (B) contains a structure derived from a surfactant (B1) having an ethylenically unsaturated bond contained in the copolymer (P). The surfactant (B) preferably further contains a surfactant (B2) not contained in the copolymer (P). Examples of the surfactant (B) used as the binder for the nonaqueous battery electrode of the present invention include anionic surfactants, cationic surfactants, and nonionic surfactants. Among them, an anionic surfactant and a nonionic surfactant are preferable. Examples of the anionic surfactant include alkylbenzene sulfonate, alkyl sulfate, polyoxyethylene alkyl ether sulfate, and fatty acid salt. Examples of the nonionic surfactant include polyoxyethylene alkyl ether, polyoxyethylene alkylphenyl ether, polyoxyethylene polycyclic finyl ether, polyoxyalkylene alkyl ether, sorbitan fatty acid ester, and polyoxyethylene sorbitan fatty acid ester.

The critical micelle concentration is the concentration at which the surfactant begins to form molecular assemblies called micelles in water. In this specification, the critical micelle concentration is a value measured by the electrical conductivity method at 25° C.

The surfactant (B) used in the binder of the present application may be used alone or in combination of two or more. The surfactant (B) is not particularly limited, but preferably contains a surfactant (B1) having a critical micelle concentration of 1.00 to 0.01% by mass and an ethylenically unsaturated bond. When the surfactant (B1) is used, the stability of the particles is improved, and the effect of the present invention can be achieved while maintaining the stability of the slurry even in a small amount.

Examples of the surfactant having an ethylenically unsaturated bond (B1) include surfactants represented by general formulas (1) to (4).

General formula (1):

[Chemical Formula 1]

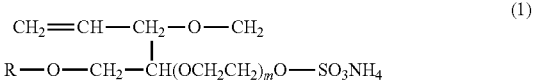

In general formula (1), R is an alkyl group, and m is an integer of 10 to 40.

General formula (2):

[Chemical Formula 2]

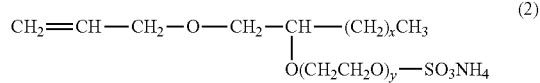

In formula (2), x is an integer of 10 to 12, and y is an integer of 10 to 40.

General formula (3):

[Chemical Formula 3]

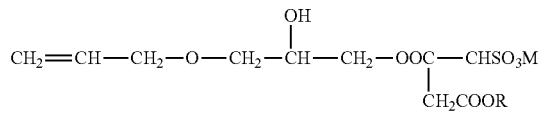 (3)

In formula (3), R is an alkyl group, and M is $NH_4$ or Na.

General formula (4)

[Chemical Formula 4]

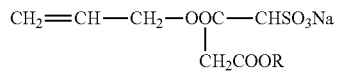 (4)

In formula (4), R is an alkyl group.

The total amount of the surfactant (B) used is 0.10 to 1.00 parts by mass based on 100 parts by mass of the total amount of the ethylenically unsaturated monomer (A). It is preferably 0.10 to 0.50 parts by mass, more preferably 0.10 parts by mass or more and less than 0.30 parts by mass. When the amount of the surfactant (B) used is 0.10 parts by mass or more, emulsion polymerization is easy and the mechanical stability of the obtained binder is improved. In addition, when the amount of the surfactant (B) used is 0.10 parts by mass or more, the particle diameter contained in the water-dispersed emulsion which is a binder obtained by emulsion polymerization is small, and precipitation of the particles is hardly generated. When the amount of the surfactant (B) used is 1.00 parts by mass or less, the adhesion between the active material of the electrode and the current collector and the electrolyte immersion property of the electrode are improved. The detailed reason is unknown, but it is presumed as follows. When the amount is large, the surfactant (B) attached to the active material and the current collector increases, and as a result, the interaction between the active materials and between the active material and the current collector is inhibited. Therefore, the adhesion between the active materials and between the active material and the current collector becomes low. Since the graphite surface is generally hydrophobic, when the surfactant (B) adheres to the graphite surface, the graphite surface is modified to be hydrophilic. As a result, compatibility with the hydrophobic electrolyte is deteriorated, and the electrolyte immersion property is lowered. Therefore, the periphery of the electrolytic solution on the graphite surface deteriorates, the initial capacity of the battery decreases, and the internal resistance increases.

The surfactant (B) preferably contains 30 to 100% by mass of a surfactant having an ethylenically unsaturated bond (B1), more preferably 40 to 100% by mass, and still more preferably 50 to 100% by mass. When the surfactant (B) contains 30% by mass or more of a surfactant (B1), the effect of the present invention can be exerted while maintaining the stability of the slurry even with a small amount of the surfactant.

The amount of the surfactant (B) is the sum of the amount of the structural unit derived from the surfactant (B1) in the copolymer (P) and the amount of the surfactant (B2) not contained in the copolymer (P). That is, the total amount of the structural unit derived from the surfactant (B1) having the ethylenically unsaturated bond in the copolymer (P) and the surfactant (B2) not contained in the copolymer (P) is 0.10 to 1.00 parts by mass with respect to 100 parts by mass of the copolymer (P). It is preferably 0.10 to 0.50 parts by mass, more preferably 0.10 parts by mass or more and less than 0.30 parts by mass.

The structure derived from the surfactant (B1) contained in the binder for the nonaqueous battery electrode is preferably 0.03 parts by mass to 1.0 parts by mass, more preferably 0.03 parts by mass to 1.0 parts by mass, and still more preferably 0.03 parts by mass to 0.3 parts by mass, based on 100 parts by mass of the copolymer (P).

The parts by mass of the structural unit derived from the surfactant (B1) can be obtained from the amount of the surfactant (B1) mixed with the ethylenically unsaturated monomer (A). The amount of the surfactant (B1) to be used is preferably from 0.03 parts by mass to 1.0 parts by mass, more preferably from 0.03 parts by mass to 1.0 parts by mass, and still more preferably from 0.03 parts by mass to 0.3 parts by mass with respect to 100 parts by mass of the total amount of the ethylenically unsaturated monomer (A).

Polymerization Initiator

The binder of the present invention preferably contains a radical polymerization initiator. The radical polymerization initiator used in the polymerization is not particularly limited, and a known radical polymerization initiator can be used. Examples of the radical polymerization initiator include ammonium persulfate, potassium persulfate, hydrogen peroxide, t-butyl hydroperoxide, and the like. In addition, if necessary, a radical polymerization initiator and a reducing agent such as sodium bisulfite, Rongalite, or ascorbic acid may be used in combination to perform redox polymerization during emulsion polymerization.

The amount of the polymerization initiator with respect to 100 parts by mass of the ethylenically unsaturated monomer (A) is preferably 0.01 to 10.0 parts by mass, more preferably 0.10 to 7.50 parts by mass, and still more preferably 0.10 to 5.00 parts by mass.

Copolymer (P)

The amount of the copolymer (P) is preferably 95.0 to 99.5 parts by mass, more preferably 95.5 to 99.0 parts by mass, and still more preferably 96.0 to 98.5 parts by mass with respect to 100 parts by mass of the nonvolatile amount of the binder for the nonaqueous battery electrode.

The copolymer (P) is obtained by polymerizing the ethylenically unsaturated monomer (A) with a surfactant (B1) having an ethylenically unsaturated bond. The polymerization method is preferably emulsion polymerization in an aqueous medium. The emulsion polymerization can be carried out using a radical polymerization initiator in an aqueous medium. As the emulsion polymerization method, for example, a method for carrying out emulsion polymerization by collectively charging all components used for emulsion polymerization, a method for carrying out emulsion polymerization while continuously supplying each component used for emulsion polymerization, or the like is used. Among these, since fine binder particles having a uniform particle size can be obtained and heat removal during the reaction can be efficiently performed, it is preferable to carry out emulsion polymerization while continuously supplying each component used for emulsion polymerization. Emulsion polymerization is usually carried out with stirring at a temperature of 30 to 90° C.

The polymerization stability, mechanical stability and chemical stability during emulsion polymerization can be improved by adjusting the pH by adding a basic substance to the ethylenically unsaturated monomer (A) copolymerized in the present invention during or after polymerization.

The basic substances used in this case include ammonia, triethylamine, ethanolamine, caustic soda, lithium hydroxide, potassium hydroxide, sodium hydroxide, magnesium hydroxide, calcium hydroxide, and the like. These may be used alone or in combination of two or more.

In the present invention, water is usually used as the aqueous medium. As long as the polymerization stability of the obtained binder is not impaired, a hydrophilic solvent may be added to water as the aqueous medium. Hydrophilic solvents added to water include methanol, ethanol, N-methylpyrrolidone and the like.

The amount of the surfactant (B) in the binder is 0.10 to 1.00 parts by mass based on 100 parts by mass of the copolymer (P). It is preferably 0.10 to 0.50 parts by mass, more preferably 0.10 parts by mass or more and less than 0.30 parts by mass.

Slurry for Nonaqueous Battery Electrode

The slurry of the present invention contains the binder for the nonaqueous battery electrode, an active material, and an aqueous medium; as well as a thickener compounded as necessary.

The amount of the binder contained in the slurry as a nonvolatile component of the binder is preferably 0.1 to 1.8 parts by mass, more preferably 0.3 to 1.7 parts by mass, and still more preferably 0.5 to 1.6 parts by mass based on 100 parts by mass of the active material. When the amount of the nonvolatile component of the binder is 0.1 parts by mass or more, the binder has good binding properties between the active material and the current collector, and the charge/discharge cycle characteristics are improved. On the other hand, if it is 1.8 parts by mass or less, the internal resistance of the battery is low, the initial capacity is high, and the charge/discharge cycle characteristics tend to be improved.

The nonvolatile component concentration of the slurry for the nonaqueous battery electrode is preferably 30 to 70% by mass, more preferably 40 to 60% by mass. The viscosity of the slurry for the nonaqueous battery electrode is preferably 500 to 20,000 mPa·s, more preferably 5,000 to 20,000 mPa·s. When the nonvolatile amount of the slurry is 30 to 70% by mass and the viscosity is 500 to 20,000 mPa·s, a coating property to the current collecting plate is excellent and the productivity of the electrode is excellent. The nonvolatile component of the slurry can be adjusted by the amount of the aqueous medium. The viscosity of the slurry is adjusted by the amount of the aqueous medium and the thickener.

From the viewpoint of battery durability, the pH of the slurry is preferably 2 to 10, more preferably 4 to 9, and still more preferably 6 to 9.

The method of preparing the slurry of the present invention may be a known method and is not particularly limited. For example, a method of mixing the binder for a nonaqueous battery electrode of the present invention, and an active material; as well as a conductive auxiliary agent, a thickener, or the like contained as needed; and an aqueous medium (dispersion medium) using a mixing device, can be used. Examples of the mixing apparatus include a stirring type, a rotating type, and a shaking type.

Aqueous Medium

The aqueous medium is at least one medium selected from the group consisting of water and a hydrophilic solvent. And the medium used for the synthesis of the binder and a different medium can be used. Examples of the hydrophilic solvent include methanol, ethanol and N-methylpyrrolidone.

Active Material

The active material may be any material capable of intercalating/deintercalating lithium ions or the like. When the slurry for the nonaqueous battery electrode is for forming the negative electrode, for example, conductive polymer, carbon material, lithium titanate, silicon, and the like can be cited. Examples of the conductive polymer include polyacetylene, polypyrrole, and the like. Examples of the carbon material include carbon black, coke, and graphite. Specific examples of coke include petroleum coke, pitch coke, and coal coke. Examples of the graphite include artificial graphite and natural graphite. Among these active materials, a carbon material is preferable from the viewpoint of improving the binding property by the copolymer (P). Among them, carbon black, artificial graphite, natural graphite, lithium titanate, silicon or the like is preferable from the viewpoint of energy density per volume.

When the slurry for the nonaqueous battery electrode is an active material for forming the positive electrode, it is not particularly limited as long as it can be used for the nonaqueous battery. Examples of the positive electrode active material include lithium cobaltate ($LiCoO_2$), a lithium complex oxide containing nickel, a spinel type lithium manganate ($LiMn_2O_4$), an olivine type lithium iron phosphate, a chalcogen compound, and the like. One or more of these are used in combination. Specific examples of the nickel-containing lithium complex oxide include a Ni-Co-Mn based lithium complex oxide, a Ni-Mn-Al based lithium complex oxide, and a Ni-Co-Al based lithium complex oxide. Specific examples of the chalcogen compound include $TiS_2$, $MnO_2$, $MoO_3$, $V_2O_5$, and the like. Other metal oxides using alkali metals can also be used.

Conductive Auxiliary Agent

A conductive auxiliary agent can be added to the slurry of the present invention. The conductive auxiliary agent may be any material having electrical conductivity between the active materials. Examples of the conductive auxiliary agent include carbon black such as polymer charcoal, carbon fiber, acetylene black, and the like.

[Thickener]

Examples of the thickener include cellulose, or an ammonium salt and an alkali metal salt thereof; poly (meth)acrylic acid, or an ammonium salt and an alkali metal salt thereof; and water-soluble polymers. Specific examples of cellulose include carboxymethyl cellulose, hydroxyethyl cellulose, hydroxypropyl cellulose and the like. Specific examples of the water-soluble polymer include polyvinylacetamide (PNVA), NVA-sodium acrylate copolymer, polyvinylalcohol, polyvinylpyrrolidone and the like. Among these thickeners, since a slurry in which an active material is dispersed can be easily prepared, it is preferable to use carboxymethyl cellulose, or an ammonium salt or an alkali metal salt thereof; poly (meth)acrylic acid, or an ammonium salt or an alkali metal salt thereof; or polyvinylacetamide (PNVA), or NVA-sodium acrylate copolymer.

The amount of the thickener contained in the slurry is preferably 0.5 to 1.5 parts by mass, more preferably 0.6 to 1.4 parts by mass, and still more preferably 0.8 to 1.2 parts by mass with respect to 100 parts by mass of the active material. When the slurry contains the thickener in the added amount, the coating property of the slurry is improved. Further, in the active material layer obtained by coating and drying the slurry, the binding property between the active materials and the binding property between the active material and the current collector are further improved.

The electrode for the nonaqueous battery of the present invention can be produced by applying the slurry on the surface of the current collector and drying it to form an active material layer. Thereafter, it may be cut to an appropriate size.

Examples of the current collector used for the electrode include, but are not limited to, metals such as iron, copper, aluminum, nickel, and stainless steel. The shape of the current collector is not particularly limited, but a sheet-like collector having a thickness of 0.001 to 0.5 mm is usually used.

A general coating method can be used as the method of applying the slurry on the current collector, and the method is not particularly limited. For example, a reverse roll method, a direct roll method, a doctor blade method, a knife method, an extrusion method, a curtain method, a gravure method, a bar method, a dip method, a squeeze method and the like can be mentioned. Among them, the doctor blade method, the knife method, or the extrusion method is preferably used in view of being suitable for various physical properties such as viscosity and drying properties of the slurry used for the electrode of the nonaqueous battery, and being capable of obtaining a coating film having a good surface condition.

The slurry may be applied only to one side of the current collector or may be applied to both sides. When the slurry is applied to both sides of the current collector, the slurry may be applied one side at a time or simultaneously to both sides. The slurry may be applied continuously or intermittently to the surface of the current collector. The thickness, length and width of the coating film obtained by applying the slurry can be appropriately determined according to the size of the battery or the like.

The method of forming the active material layer by drying the coating film formed by coating the slurry is not particularly limited, and a known method can be used. For example, as the drying method, hot air, a vacuum, a (far) infrared ray, an electron beam, and cold air can be used alone or in combination.

The temperature at which the coating film is dried is in the range of 40 to 180° C., and the drying time is from 1 to 30 minutes.

The current collector on which the active material layer is formed is cut to have an appropriate size and shape as an electrode. A method of cutting the current collector on which the active material layer is formed is not particularly limited, but a slit, a laser, a wire cutter, a cutter, a Thomson blade, or the like can be used.

Before or after cutting the current collector on which the active material layer is formed thereon, it may be pressed as necessary. By performing pressing step, the active material is firmly bound to the electrode, and the electrode is thinned to make the nonaqueous battery compact. As the pressing method, a general method can be used, and it is particularly preferable to use a die pressing method or a roll pressing method. The press pressure is not particularly limited, but preferably 0.5 to 5 t/cm$^2$, which does not affect the intercalating/deintercalating of lithium ions or the like into/from the active material by the press.

A nonaqueous solution having high ionic conductivity is used as the electrolyte solution. Examples of the nonaqueous solution include an organic solvent in which an electrolyte is dissolved and an ionic liquid.

As the electrolyte, a known alkali metal salt can be used, and it can be appropriately selected according to the kind of the active material or the like. Examples of the electrolytes include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, lithium aliphatic carboxylate, and the like. Salts using other alkali metals may also be used.

A known organic solvent or ionic liquid for dissolving the electrolytes may be used, and is not particularly limited. Examples of the organic solvents include ethylene carbonate (EC), propylene carbonate (PC), diethyl carbonate (DEC), methyl ethyl carbonate (MEC), and dimethyl carbonate (DMC). Examples of the ionic liquid include N, N-bis (trifluoromethanesulfonyl) imide, fluorosulfonyl imide or the like that can be used as the anion, and 1-ethyl-3 methylimidazolium, N, N-dimethyl-N-ethyl-N-methoxyethylammonium and the like. These electrolytes may be used alone or in combination of two or more electrolytes.

The nonaqueous battery of the present invention includes the above-mentioned electrodes. In the battery, a positive electrode, a negative electrode, an electrolyte, and components such as a separator, if necessary, are housed in an exterior body, and the electrode produced by the above method is used for one or both of the positive electrode and the negative electrode. Examples of the shape of the electrode include, but are not limited to, a laminated body and a wound body.

A metal or aluminum laminate material can be suitably used as the exterior body. The shape of the battery may be any of a coin shape, a button shape, a sheet shape, a cylinder shape, a square shape, a flat shape, and the like. The battery of this embodiment can be produced by a known producing method.

EXAMPLES

The present invention will be described in more detail below with reference to examples and comparative examples, but the present invention is not limited thereto. Note that "parts" and "%" in the Examples and Comparative Examples respectively indicate "parts by mass" and "% by mass" unless otherwise specified.

The physical properties and performance evaluation tests of the binders and the batteries obtained using these binders in Examples and Comparative Examples were carried out by the following methods.

Nonvolatile Component

About 1 g of resin was weighed on an aluminum dish having a diameter of 5 cm, and dried at 105° C. for 1 hour, and the remainder was weighed.

Viscosity

The viscosity of the binder dispersion was measured using a Brookfield type rotational viscometer at a liquid temperature of 23° C. and a rotational speed of 60 rpm in a No. 2 rotor.

The viscosity of the slurry was measured using a Brookfield type rotational viscometer at a liquid temperature of 23° C. and a rotational speed of 2 rpm in a No. 2 rotor.

Glass Transition Temperature (Tg)

The theoretical Tg was calculated by the method described above.

Example 1

Manufacture of Nonaqueous Battery Electrode Binder (II-1)

A separable flask having a cooling tube, a thermometer, a stirrer, and a dropping funnel was charged with 33.7 parts by mass of water, and the temperature was raised to 75° C. while bubbling nitrogen gas. Thereafter, while stirring, a prepared emulsion containing a surfactant (B), an ethylenically unsaturated monomer (A), and water; and a polymerization initiator were dropped into the separable flask at 80° C. for 3 hours, and emulsion polymerization was carried out. The compositions of the surfactant (B) and the ethylenically unsaturated monomer (A) in the emulsion dropped into the separable flask are as shown in Table 1. The amount of water in the emulsion is 48.1 parts by mass based on 100 parts by mass of the ethylenically unsaturated monomer (A). The emulsion polymerization was carried out by dropping the entire composition, aging the mixture at 80° C. for 2 hours with stirring, cooling the mixture, adding 4.2 parts by mass of 25% by mass aqueous ammonia ($NH_3$) to the separable flask, and then adding dilution water to obtain a composition (I-1) in which a nonaqueous battery electrode binder was dispersed in water. The composition (I-1) was dried to provide a nonaqueous battery electrode binder (II-1). The Tg of the binder (II-1) was −2° C. The composition (I-1) had a nonvolatile amount of 40.0% by mass, a viscosity of 40 mPa·s, and a pH of 7.2. The amounts of each component added are shown in Table 1, and the evaluation results are shown in Table 2. In this Example, it is assumed that the whole amount of the charged ethylenically unsaturated monomer (A) is incorporated into the copolymer (P). In Table 1, the total amount of ethylenically unsaturated monomer (A) is expressed as 100 parts by mass.

Details of each component in Table 1 are shown as follows.

SM: Styrene
NASS: Sodium parastylenesulfonate
2EHA: 2-ethylhexyl acrylate
2HEMA: 2-hydroxyethyl methacrylate
IA: Itaconic acid
Aa: Acrylic acid
DVB: Divinylbenzene
JS 20: Eleminol JS-20 at a concentration of 40% by mass (Manufactured by Sanyo Chemical Co., Ltd.; anionic surfactant, critical micelle concentration 0.02% by mass, sodium alkylallyl sulfosuccinate; a compound represented by the formula (3), wherein M is Na.)
08E: High Tenor 08E (Manufactured by Daiichi Kogyo Seiyaku Co., Ltd.; Polyoxyethylene alkyl ether sulfate salt, critical micelle concentration 0.08% by mass)
KPS: Potassium persulfate
100 parts by mass of graphite (Produced by Showa Denko, SCMG (registered trade mark) -BR) as a negative electrode active material, 2 parts by mass of acetylene black as a conductive auxiliary agent, and 1 parts by mass of carboxymethyl cellulose-sodium salt (Sunrose MAC 500 LC manufactured by Nippon Paper Chemicals Co., Ltd.) as a thickener were weighed, a small amount of water was added thereto, and the mixture was kneaded at 60 rotations per minute for 20 minutes using a stirring type mixing apparatus (planetary mixer). Next, the above-mentioned nonaqueous battery electrode composition (I-1) was added so that the nonvolatile amount thereof was 1.5 parts by mass, and an additional amount of water was added to a total of 104.5 parts by mass of graphite, acetylene black, carboxymethyl cellulose-sodium salt, and binder dispersion so that the total of the water with the previously-added water was 104.5 parts by mass, and the mixture was further mixed at 60 rotations/minute for 20 minutes to prepare a slurry for a negative electrode. The negative electrode slurry had a nonvolatile amount concentration of 50% by mass, a viscosity of 6200 mPa·s, and a pH of 7.5.

The obtained slurry for the negative electrode was applied to one side of a copper foil having a thickness of 18 μm as a current collector by using a doctor blade so that the applied amount after drying was 12 mg/$cm^2$, heated and dried at 60° C. for 10 minutes, and then dried at 120° C. for 10 minutes to form an active material layer. Then, the negative electrode for evaluation was obtained through a press process at a press linear pressure of 0.15 t/cm using a roll press machine.

Evaluation of Electrolyte Immersion Properties of Electrodes

By using the above-mentioned negative electrode for evaluation, the electrolyte immersion property was evaluated as follows. A micropipette was used to measure and take 4 μL of a mixed solvent of ethylene carbonate (EC) and ethylmethyl carbonate (EMC) in a volume ratio of 40:60. A visual observation was carried out during a period from depositing droplets on the negative electrode for evaluation by dropping the droplets from a height of 1 cm onto the negative electrode for evaluation until completely immersing the droplets into the negative electrode for evaluation. The time of the period was measured.

Manufacture of Lithium-ion Rechargeable Batteries

Next, a lithium ion secondary battery was manufactured as follows using the above-mentioned negative electrode for evaluation. As the positive electrode to be combined with the negative electrode for evaluation, a positive electrode prepared by the following procedure was used. To a mixture of 90 parts by mass of $LiCoO_2$, 5 parts by mass of acetylene black as a conductive auxiliary agent, 5 parts by mass of polyvinylidene fluoride as a binder, and 100 parts by mass of N-methylpyrrolidone was added and further mixed to prepare a positive electrode slurry. The resulting positive electrode slurry was applied to one side of an aluminum foil as a current collector having a thickness of 20 μm using a doctor blade so that the applied amount after drying was 22 mg/$cm^2$, and dried at 120° C. for 5 minutes. Thereafter, a positive electrode for evaluation was obtained through a press step.

The electrolyte used in the lithium ion secondary battery was prepared by dissolving $LiPF_6$ in a mixed solvent of ethylene carbonate (EC) and ethylmethyl carbonate (EMC) in a volume ratio of 40:60 so as to have a concentration of 1.0 mol/L.

A conductive tab was attached to each of the obtained positive and negative electrodes for evaluation, a separator made of a polyolefin porous film was interposed between the positive and negative electrodes for evaluation, and the active materials of the positive and negative electrodes for evaluation were housed in an aluminum laminate exterior body (battery package) so as to face each other. Electrolyte was injected into the exterior body, and packed by a vacuum heat sealer, and a laminate type battery having a theoretical capacity of 135 mAh was obtained. The initial capacity and the DC internal resistance of the battery thus obtained were measured. Table 2 shows the evaluation results of the above negative electrode for evaluation and lithium ion secondary battery.

Example 2 to 13 and Comparative Example 1 to 12

Preparation of Binder (II-2) to (II-25)

Compositions (I-2) to (I-25) and binders (II-2) to (II-25) were prepared in the same manner as the compositions (I-1) and binders (II-1) of Example 1, except that the components were changed as shown in Table 1. The amounts of each component added are shown in Table 1, and the evaluation results are shown in Table 2.

An negative electrode for evaluation and a lithium ion secondary battery were prepared and their performances were evaluated in the same manner as in Example 1 except that the composition (I-1) of Example 1 was changed to the compositions (I-2) to (I-25). The results are shown in Table 2.

As can be seen from the results in Table 2, when the amount of the surfactant (B) was 0.10 to 1.00 parts by mass in the example, high penetration, high initial capacity of the battery, and low internal resistance were achieved. Further, when the amount of the surfactant (B) was 0.10 parts by mass or more and less than 0.30 parts by mass, the penetration property was higher and the internal resistance was even better.

TABLE 1

| | | Composition [parts by mass] | | | | | | | | | Polymerization initiator |
|---|---|---|---|---|---|---|---|---|---|---|---|
| | | Ethylenically unsaturated monomer (A) | | | | | | | (B1) | (B2) | |
| | | (a1) | | (a2) | | (a3) | | (a4) | | | |
| | Composition | SM | NASS | 2EHA | 2HEMA | IA | Aa | DVB | JS20 | 08E | KPS |
| Example 1 | I-1 | 49.2 | 0.58 | 43.2 | 1.93 | 1.93 | 3.08 | 0.08 | 0.05 | 0.05 | 0.42 |
| Example 2 | I-2 | 49.2 | 0.58 | 43.2 | 1.93 | 1.93 | 3.08 | 0.08 | 0.10 | 0.10 | 0.42 |
| Example 3 | I-3 | 51.4 | 0.57 | 39.9 | 1.90 | 1.90 | 3.04 | 1.31 | 0.05 | 0.05 | 0.42 |
| Example 4 | I-4 | 51.4 | 0.57 | 39.9 | 1.90 | 1.90 | 3.04 | 1.31 | 0.10 | 0.10 | 0.42 |
| Example 5 | I-5 | 56.8 | 0.57 | 42.5 | 0.00 | 0.00 | 0.00 | 0.19 | 0.28 | 0.00 | 0.42 |
| Example 6 | I-6 | 49.1 | 0.60 | 43.1 | 1.98 | 1.98 | 3.17 | 0.08 | 0.22 | 0.21 | 0.44 |
| Example 7 | I-7 | 56.8 | 0.57 | 42.5 | 0.00 | 0.00 | 0.00 | 0.19 | 0.38 | 0.00 | 0.42 |
| Example 8 | I-8 | 48.7 | 0.57 | 42.8 | 1.91 | 1.91 | 3.05 | 1.14 | 0.22 | 0.20 | 0.42 |
| Example 9 | I-9 | 48.7 | 0.57 | 42.8 | 1.91 | 1.91 | 3.05 | 1.14 | 0.22 | 0.20 | 0.42 |
| Example 10 | I-10 | 51.4 | 0.57 | 39.9 | 1.90 | 1.90 | 3.04 | 1.31 | 0.21 | 0.20 | 0.42 |
| Example 11 | I-11 | 56.8 | 0.57 | 42.5 | 0.00 | 0.00 | 0.00 | 0.19 | 0.95 | 0.00 | 0.42 |
| Example 12 | 1-12 | 49.2 | 0.58 | 43.2 | 1.93 | 1.93 | 3.08 | 0.08 | 0.22 | 0.20 | 0.27 |
| Example 13 | I-13 | 49.2 | 0.58 | 43.2 | 1.93 | 1.93 | 3.08 | 0.08 | 0.58 | 0.20 | 0.42 |
| Comparative Example 1 | I-14 | 51.4 | 0.57 | 39.9 | 1.90 | 1.90 | 3.04 | 1.31 | 0.95 | 0.20 | 0.42 |
| Comparative Example 2 | I-15 | 49.2 | 0.58 | 43.2 | 1.93 | 1.93 | 3.08 | 0.08 | 0.96 | 0.20 | 0.42 |
| Comparative Example 3 | I-16 | 48.5 | 0.60 | 43.7 | 1.98 | 1.98 | 3.17 | 0.08 | 1.00 | 0.40 | 0.28 |
| Comparative Example 4 | I-17 | 47.4 | 0.59 | 43.8 | 1.96 | 1.96 | 3.14 | 1.18 | 0.99 | 0.39 | 0.28 |
| Comparative Example 5 | I-18 | 50.1 | 0.59 | 44.0 | 0.00 | 1.96 | 3.14 | 0.18 | 0.99 | 0.39 | 0.27 |
| Comparative Example 6 | I-19 | 49.6 | 0.58 | 43.6 | 0.00 | 1.94 | 3.11 | 1.17 | 0.98 | 0.39 | 0.27 |
| Comparative Example 7 | I-20 | 46.9 | 0.59 | 47.3 | 0.00 | 1.96 | 3.14 | 0.16 | 0.99 | 0.39 | 0.27 |
| Comparative Example 8 | I-21 | 46.4 | 0.58 | 46.8 | 0.00 | 1.94 | 3.11 | 1.17 | 0.98 | 0.39 | 0.27 |
| Comparative Example 9 | I-22 | 49.3 | 0.60 | 44.3 | 0.00 | 2.01 | 3.22 | 0.60 | 1.02 | 0.40 | 0.28 |
| Comparative Example 10 | I-23 | 46.6 | 0.59 | 47.1 | 0.00 | 1.95 | 3.13 | 0.59 | 0.99 | 0.39 | 0.27 |
| Comparative Example 11 | I-24 | 56.8 | 0.57 | 42.5 | 0.00 | 0.00 | 0.00 | 0.19 | 0.95 | 0.38 | 0.42 |
| Comparative Example 12 | I-25 | 56.8 | 0.57 | 42.5 | 0.00 | 0.00 | 0.00 | 0.19 | 1.70 | 0.00 | 0.42 |

SM: Styrene
NASS: sodium p-styrenesulfonate
2EHA: 2-ethylhexyl acrylate
2 HEMA: 2-hydroxyethyl methacrylate
IA: itaconic acid
Aa: acrylic acid
DVB: divinylbenzene
The composition and calculation are based on 100 parts by mass of the sum of the ethylenically unsaturated monomers (A).

TABLE 2

| | Composition | Composition Nonvolatile [%] | Composition Viscosity [mPa·s] | pH | Binder Tg [°C.] | Slurry Viscosity [mPa·s] | Electrode Immersion time [Sec] | Battery Initial capacity [mAh] | Battery Internal resistance [ohm] |
|---|---|---|---|---|---|---|---|---|---|
| Example 1 | I-1 | 40.0 | 40 | 7.2 | −2 | 6200 | 62 | 132 | 0.52 |
| Example 2 | I-2 | 40.0 | 60 | 7.1 | −2 | 6300 | 64 | 132 | 0.52 |
| Example 3 | I-3 | 40.0 | 120 | 7.1 | 3 | 6100 | 64 | 131 | 0.52 |
| Example 4 | I-4 | 40.0 | 50 | 7.3 | 3 | 6200 | 65 | 131 | 0.52 |
| Example 5 | I-5 | 40.0 | 30 | 7.2 | 3 | 6000 | 60 | 132 | 0.52 |
| Example 6 | I-6 | 40.0 | 30 | 7.1 | −2 | 6200 | 59 | 131 | 0.55 |
| Example 7 | I-7 | 40.0 | 20 | 7.2 | 3 | 6000 | 64 | 131 | 0.54 |
| Example 8 | I-8 | 40.0 | 100 | 7.4 | −2 | 6300 | 64 | 132 | 0.54 |
| Example 9 | I-9 | 40.0 | 120 | 7.3 | −2 | 5900 | 68 | 132 | 0.56 |
| Example 10 | I-10 | 40.0 | 110 | 7.4 | 3 | 6100 | 68 | 132 | 0.54 |
| Example 11 | I-11 | 40.0 | 40 | 7.3 | 3 | 6100 | 68 | 132 | 0.56 |
| Example 12 | I-12 | 40.0 | 70 | 7.1 | −2 | 6200 | 69 | 131 | 0.55 |
| Example 13 | I-13 | 40.0 | 150 | 7.2 | −2 | 6200 | 69 | 131 | 0.56 |
| Comparative Example 1 | I-14 | 40.0 | 190 | 7.2 | 3 | 6200 | 73 | 128 | 0.60 |
| Comparative Example 2 | I-15 | 40.0 | 210 | 7.2 | −2 | 6300 | 75 | 126 | 0.61 |
| Comparative Example 3 | I-16 | 40.0 | 230 | 7.4 | −2 | 6400 | 79 | 125 | 0.63 |
| Comparative Example 4 | I-17 | 40.0 | 290 | 7.4 | −2 | 6300 | 81 | 126 | 0.64 |
| Comparative Example 5 | I-18 | 40.0 | 190 | 7.2 | −2 | 6200 | 75 | 128 | 0.62 |
| Comparative Example 6 | I-19 | 40.0 | 170 | 7.2 | −2 | 6400 | 75 | 129 | 0.62 |
| Comparative Example 7 | I-20 | 40.0 | 180 | 7.4 | −7 | 6500 | 76 | 126 | 0.61 |
| Comparative Example 8 | I-21 | 40.0 | 60 | 7.4 | −7 | 6300 | 78 | 127 | 0.62 |
| Comparative Example 9 | I-22 | 40.0 | 80 | 7.2 | −2 | 6400 | 78 | 128 | 0.62 |
| Comparative Example 10 | I-23 | 40.0 | 130 | 7.2 | −7 | 6200 | 79 | 125 | 0.62 |
| Comparative Example 11 | I-24 | 40.0 | 200 | 7.1 | 3 | 6200 | 84 | 126 | 0.61 |
| Comparative Example 12 | I-25 | 40.0 | 260 | 7.3 | 3 | 6200 | 89 | 124 | 0.62 |

INDUSTRIAL APPLICABILITY

The nonaqueous battery manufactured by using the binder for the nonaqueous battery electrode of the present invention has a good electrolyte immersion property into the electrode and an excellent initial capacity of the battery and an excellent internal resistance of the battery, and is therefore suitable as a power source for a notebook type personal computer, a portable telephone, a power tool, and electronic/communication equipment. It is also suitable as a power source for an electric vehicle or a hybrid vehicle.

The invention claimed is:

1. A slurry for a nonaqueous battery electrode, comprising:
    an active material;
    a binder for the nonaqueous battery electrode; and
    an aqueous medium,
    wherein the slurry for the nonaqueous battery electrode is for forming a negative electrode, and the active material is a negative electrode active material comprising at least one selected from the group consisting of conductive polymer, carbon material, lithium titanate, and silicon, and
    the binder for the nonaqueous battery electrode comprises:
        a copolymer (P) of
            an ethylenically unsaturated monomer (A) comprising a styrene-based monomer (a1) and a (meth)acrylate (a2), and
            a surfactant (B1) having an ethylenically unsaturated bond; and
        a surfactant (B2) not contained in the copolymer (P),
        wherein a total amount of
            a structural unit derived from the surfactant (B1) having the ethylenically unsaturated bond in the copolymer (P), and
            the surfactant (B2) not contained in the copolymer (P) is 0.10 parts by mass or more and less than 0.30 parts by mass with respect to 100 parts by mass of the copolymer (P).

2. The slurry for the nonaqueous battery electrode according to claim 1,
    wherein in the ethylenically unsaturated monomer (A), the total amount of the styrene-based monomer (a1) and the (meth)acrylate (a2) is 70 to 100% by mass.

3. The slurry for a nonaqueous battery electrode according to claim 1,
    wherein in the ethylenically unsaturated monomer (A), the total amount of the styrene-based monomer (a1) is 15.0 to 70.0% by mass.

4. The slurry for nonaqueous battery electrodes according to claim 1,
wherein the styrene-based monomer (a1) is at least one selected from the group consisted of styrene, chlorostyrene, vinyltoluene, t-butylstyrene, vinylbenzoic acid, methyl vinylbenzoate, vinylnaphthalene, chloromethylstyrene, hydroxymethylstyrene, p-styrenesulfonic acid, and sodium p-styrenesulfonate.

5. The slurry for nonaqueous battery electrodes according to claim 1,
wherein in the ethylenically unsaturated monomer (A), the total amount of the (meth)acrylate (a2) is 30.0 to 85.0% by mass.

6. The slurry for a nonaqueous battery electrode according to claim 1, further comprising:
an ethylenically unsaturated carboxylic acid (a3) having one ethylenically unsaturated bond in the molecule.

7. The slurry for a nonaqueous battery electrode according to claim 1,
wherein the copolymer (P) is obtained by emulsion polymerization of the ethylenically unsaturated monomer (A) and the surfactant (B1)
in the presence of the surfactant (B1) and the surfactant (B2).

8. The slurry for a nonaqueous battery electrode according to claim 1,
wherein the binder has a glass transition temperature of 30° C. or less.

9. A nonaqueous battery negative electrode, comprising:
an electrode current collector, and
an active material layer formed by drying the slurry for the nonaqueous battery electrodes according to claim 1 on at least one surface of the electrode current collector.

10. A nonaqueous battery comprising the nonaqueous negative battery electrode according to claim 9.

* * * * *